United States Patent [19]

Baumgartner

[11] 4,114,953

[45] Sep. 19, 1978

[54] MOTOR VEHICLE WHEEL

[75] Inventor: Heinrich Baumgartner, Schenkenzell, Fed. Rep. of Germany

[73] Assignee: BBS-Kraftfahrzeugtechnik GmbH & Co. KG, Schiltach, Fed. Rep. of Germany

[21] Appl. No.: 762,100

[22] Filed: Jan. 24, 1977

[30] Foreign Application Priority Data

Jan. 24, 1976 [DE] Fed. Rep. of Germany ....... 2602710

[51] Int. Cl.² .............................................. B60B 1/10
[52] U.S. Cl. ......................... 301/63 DD; 301/63 PW; 301/64 SH
[58] Field of Search ....... 301/63 DD, 64 SH, 63 DT, 301/63 DS, 63 PW, 63 C, 65–66, 106, 105 R; 29/159.03

[56] References Cited

U.S. PATENT DOCUMENTS

| 1,288,217 | 12/1918 | Schadler | 301/64 SH |
| 1,500,496 | 7/1924 | Hyde | 301/63 DD |
| 1,534,840 | 4/1925 | Coulombe | 301/66 X |
| 4,035,028 | 7/1977 | Wilcox | 301/63 DD X |

FOREIGN PATENT DOCUMENTS

| 722,411 | 12/1931 | France | 301/64 SH |
| 250,195 | 9/1926 | Italy | 301/64 SH |
| 1,955,568 | 5/1971 | Fed. Rep. of Germany | 301/63 PW |

Primary Examiner—Robert B. Reeves
Assistant Examiner—Charles A. Marmor
Attorney, Agent, or Firm—Frailey & Ratner

[57] ABSTRACT

A motor vehicle wheel, particularly a motorcycle wheel, comprising two identical, contiguous, co-axial, complementary light metal pressings or stampings fixed to a hub member, each forming half of a rim bed for a tire. The two mating wheel pressings provide a star-like wheel spider having closed hollow main and auxiliary spokes. The invention also relates to a method for the manufacture of such a vehicle wheel.

9 Claims, 5 Drawing Figures

MOTOR VEHICLE WHEEL

BACKGROUND OF THE INVENTION

There are already a large number of material and constructional combinations in the field of motor vehicle wheels.

Welded sheet steel wheels are mainly used in the mass production of cars. Multi-part cast light metal wheels are also known, whereby the individual parts thereof are interconnected by screws. Three-part wheels also exist comprising a solid cast spider and light sheet metal rim bed halves fixed thereto. Sheet steel wheels comprising two or more parts also exist which are not welded and instead are riveted. Cast and forged light metal wheels also exist. In the case of motorcycle wheels, hitherto rims have been used which have been connected with the hub made from sheet steel or cast light alloy by means of steel wire spokes. Of late, light metal wheels have been used, but these are only cast.

In view of the very varied requirements made regarding vehicle wheels, it is also necessary to accept a compromise. The main requirements are a minimum weight because the non-spring-mounted masses which includes the wheels influence the travelling behaviour of the vehicle, and, naturally, an adequate strength. The manufacturing costs are also an important factor. It is difficult to combine together these three factors in an optimum manner. Although sheet steel is relatively inexpensive, and does not prove costly in the manufacture of wheels, it is nevertheless relatively heavy.

In addition, sheet steel must be varnished or painted and is subject to considerable corrosion phenomena. Although light alloy has the same strength and is lighter, it has hitherto only permitted the manufacture of wheels by casting methods.

An exception is formed by a vehicle wheel with a double wheel disc according to German Offenlegungschrift No. 2,443,088. This vehicle wheel comprises identical light metal pressings fixed to a hub member, whereof each forms a half of the rim bed. In this construction, the two light metal pressings, whereof each forms a half of the rim bed, are joined together by a plurality of sleeve nuts, whose sleeves have an internal thread. These assembly nuts at the same time serve to fix the complete wheel to the vehicle axle flange. These sleeve nuts are expensive to manufacture. Further, the use thereof as connecting members between the two light metal pressings, while at the same time serving as means for fixing the wheel to the axle flange, leads to mechanical and loading disadvantages. In addition, such wheel is not tight, especially as the two light metal pressings have ventilation holes. The space between the two light metal pressings is filled by an elastomer material. Such a wheel is very expensive to manufacture and assemble.

SUMMARY OF THE INVENTION

The primary objective of the invention is to provide a motor vehicle wheel, particularly a motorcycle wheel which, apart optionally from the hub, is made exclusively from light sheet metal, is cheap to manufacture and simple to assemble. As is known in the case of motorcycle wheels, the loading conditions are different from those occurring with three or four wheeled vehicles, i.e. automobiles, trucks, etc. The invention has made it possible to obtain a vehicle wheel which is cheap to manufacture and has all the advantages of a wheel made from light sheet metal, particularly low weight and good corrosion resistance, while offering considerable scope for providing visually attractive designs.

A further object of the invention is to provide a vehicle wheel which is particularly suitable for a motorcycle, and which comprises two identical, contiguous, co-axial light metal pressings or stampings affixed to a hub member, whereof each provides a half of the rim bed, and is characterized in that:

(a) the hub member has cylindrical centering surfaces for the pressings, so as to mount the pressings in contiguous, opposing, co-axial relation to each other;

(b) the two light metal pressings are provided on their respective inside or facing surfaces with a layer of weldable material and are welded to both the hub member and to one another at their contiguous inside surfaces; and (c) the two assembled, complemental pressings together form a spoke wheel center having spokes constituted of closed hollow sections.

The hollow spoke sections formed by the two light metal pressings preferably have an approximately oval cross-section with the larger dimension disposed in the axial direction, which reduces radially outwardly, corresponding to the declining mechanical load.

Main spokes run approximately tangentially relative to the hub member, whereby they intersect one another. At their radially inner areas, the main spokes are connected to the hub member by short radial, angularly spaced auxiliary spokes.

The wheel according to the invention has a so-called sandwich construction.

The application of weldable or of solderable plating layers to light sheet metal is known, and in conjunction with the present invention can take place in any known and suitable manner. The wheel according to the invention comprises, except for the hub member, two identical, complementary or mating light metal pressings. The wheel has the necessary mechanical strength due to its shaping and, more particularly, to the use of spokes in the form of closed hollow sections. The complete wheel is very light and can be manufactured in an economic manner.

For preference, the hub member can be a casting with two axially spaced flanges for mounting the two light metal pressings and may have through-holes for assembly screws for connecting other wheel parts, such as cams, brake drums or discs. However, preference also is given to a construction which is characterized in that the hub member is an externally smooth tubular element, preferably of light metal, onto which are mounted the pressings, each having an outwardly directed flange. The radially inner areas of both such pressings are reinforced by steel reinforcing rings, whose shape corresponds to the inside shape of the pressings in their spoke-free sections, and which are mounted onto the hub member with inwardly directed flanges, whose edges are in engagement with one another. The pressings are welded or soldered to the hub member and to one of the reinforcing rings, and each reinforcing ring is welded or soldered to the hub member.

In order to prevent corrosion between the light metal and steel portions, particularly in the case of the above preferred construction, it is proposed that the complete rim cavity formed by the two pressings, including the local depressions in the rim bed caused by the rib shape of the pressings, be filled with a cellular hard foam, e.g. hard polyurethane foam. This simultaneously leads to an increase in the mechanical strength of the wheel and an absolute sealing thereof, so that the wheel can be used in conjunction with tubeless tires. By filling the depressions in the rim bed with foam, it is also ensured, when using tires with tubes, that the tube does not pass into the said local depressions. An additional corrosion preventing aid of the wheel from the outside can be brought about by anodic surface treatment thereof, e.g. by oxidizing.

A particularly preferred method for manufacturing the wheel according to the invention provides for the deformation of the individual pressings in the soft state, following which the heat treatment and reciprocal soldering or welding thereof take place simultaneously in a single annealing process.

DESCRIPTION OF THE FIGURES OF THE DRAWING

The accompanying drawings show two embodiments of the wheel of the invention, by way of example. In the drawings.

DETAILED DESCRIPTION OF THE INVENTION

Figure 1:
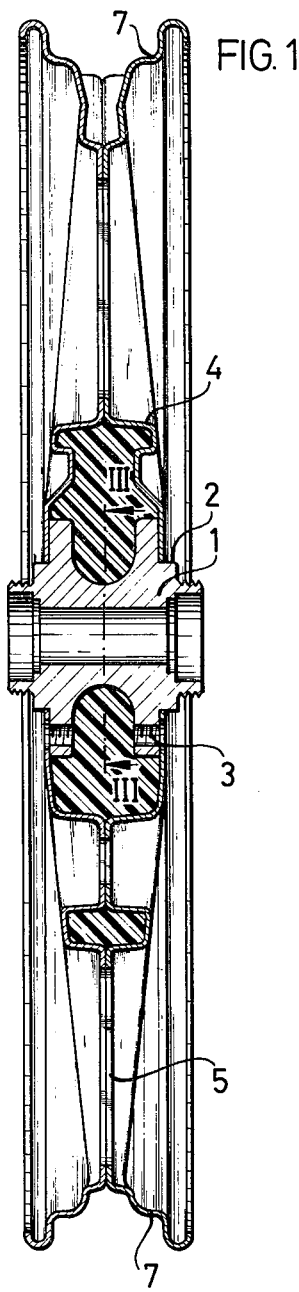
FIG. 1 shows a preferred embodiment in radial section along the line I—I of FIG. 2 of a motorcycle wheel according to the invention.
Figure 2:
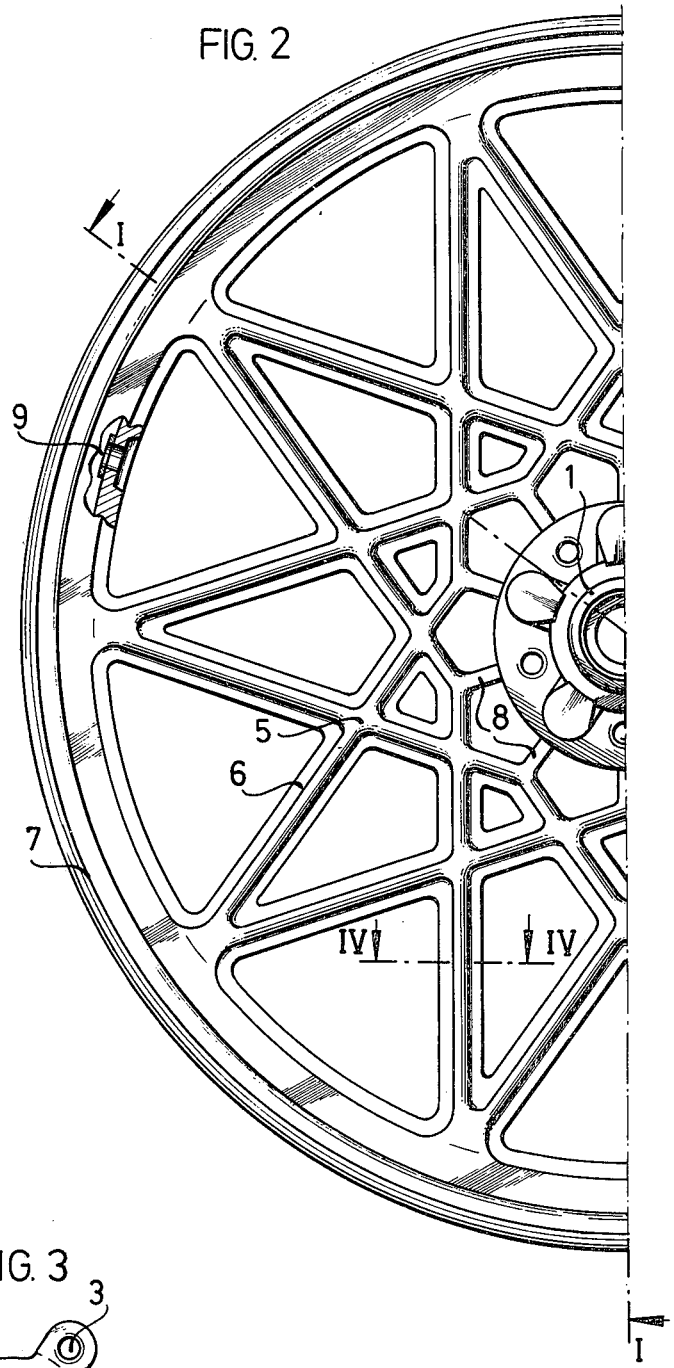
FIG. 2 shows a side view of half of the motorcycle wheel.
Figure 3:
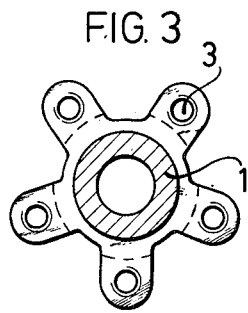
FIG. 3 shows the hub member along the section line III—III of FIG. 1.
Figure 4:
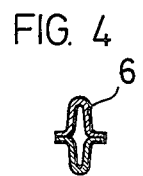
FIG. 4 shows a section along the line IV—IV of FIG. 2 through one of the spokes of the wheel spider.

The motorcycle wheel according to the invention shown in FIGS. 1-4 of the drawings has a cast hub member 1 serving for the attachment of the wheel and having on both sides cylindrical centering surfaces 2 and threaded holes 3 for assembly screws (not shown) for two identical mating or complemental light sheet metal pressings 4, provided on their opposing inside surfaces with a layer of weldable material, and which are welded together at their contiguous surfaces. The two contiguous light metal pressings 4 together form a spoke wheel center 5 having main spokes 6, each in the form of a closed hollow section, and a rim bed 7. The spoke sections formed by the two light metal pressings 4, as can be seen particularly in FIG. 4, have an approximately oval cross-section with the larger dimension or major axis in the axial direction of the wheel. The larger, axially extending dimensions or major axes of the hollow sections of the main spokes 6 gradually decrease as the spokes extend outward radially relative to the hub member 1, as shown in FIG. 1. The main spokes 6, as shown in FIG. 2, run approximately tangentially relative to hub member 1, whereby they intercept one another at various locations. At their innermost radial locations, they are connected to hub member 1 by short radial, angularly spaced auxiliary spokes 8. A soldered reinforcing plate 9 for a tire valve is provided in the rim bed 7.

Figure 5:
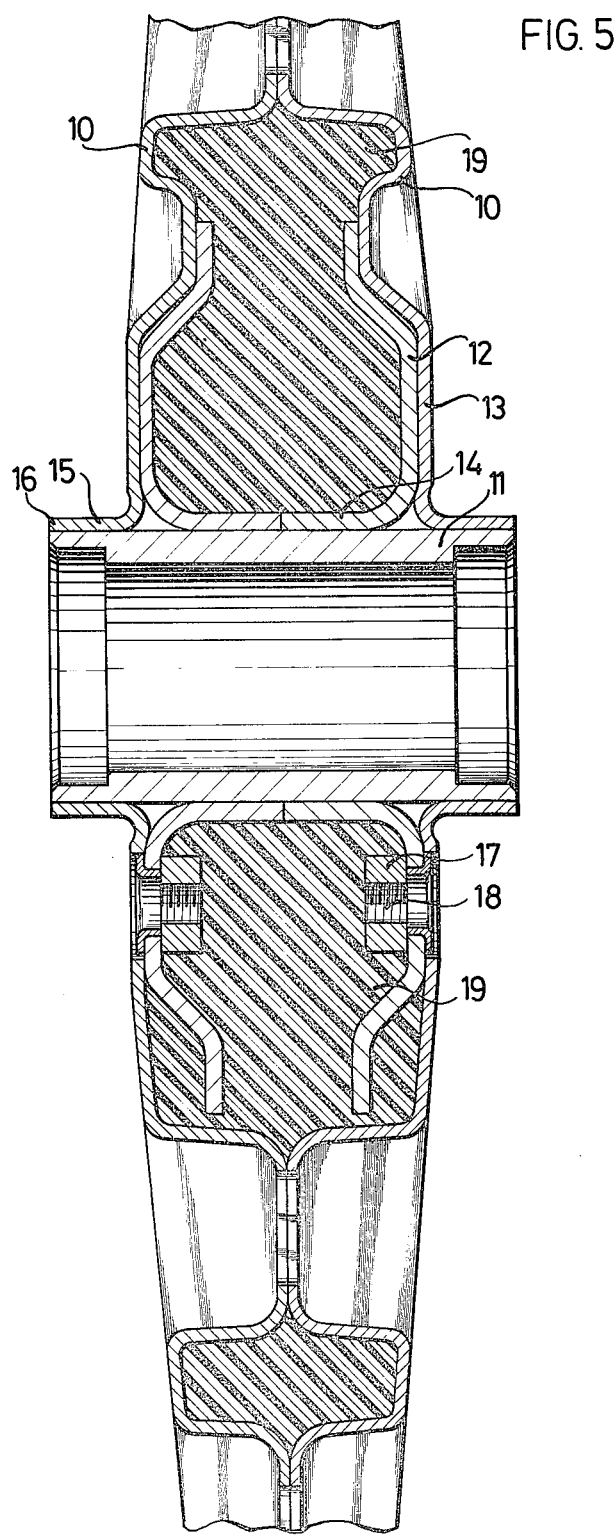
FIG. 5 shows a modification in the same sectional representation as in FIG. 1, but on a larger scale, whereby the section shows only the hub member and the parts of the wheel directly adjacent thereto, while the remaining details of the pressings are identical with the embodiment of FIGS. 1 to 4 and will be described in conjunction with the latter.

In the embodiment according to FIG. 5, the hub member 11 comprises an externally smooth tubular element, preferably made from light alloy, onto which are introduced the two light metal pressings 10 with outwardly directed flanges 15. The inner area between both pressings 10 is reinforced by steel reinforcing rings 12. The shape of these reinforcing rings 12 corresponds, as can be seen from the upper part of FIG. 5, to the inside shape of pressings 10 in the portions of the latter which are free from spokes. The reinforcing rings 12 are introduced onto the hub member 11 and have inwardly directed flanges 14, which abut. The flanges 15 of the pressings 10 are soldered or welded to the hub member 11 and at the faces 13 are also soldered or welded to the reinforcing rings 12. In turn, the reinforcing rings 12, at their flanges 14, are welded or soldered to the hub member 11. The mounting holes 18 in this embodiment pass through reinforced portions of pressings 10 and through the reinforcing rings 12, and are provided with inner captive nuts 17. The annular space or cavity 19 surrounded by the two pressings 10, and the depressions in rim bed 7 caused by the ribs and visible at the top of FIG. 1, are filled with a cellular hard polyurethane foam.

As desired, both the hub member 11 and the reinforcing rings 12 can be made from steel or from light metal. If the reinforcing rings 12 are made from steel, nuts soldered or welded to the insides of the reinforcing rings 12 can be used in place of the nuts 17.

Although two preferred embodiments of this invention have been shown and described for the purpose of illustration, in accordance with Title 35 U.S.C. § 112, it is to be understood that various changes and modifications may be made therein without departing from the spirit and utility of this invention, or the scope thereof, as set forth in the appended claims.

I claim:

1. A vehicle wheel having a rim bed, said wheel comprising two substantially identical, contiguous light metal pressings mounted on a hub member, each pressing forming a half of the rim bed, wherein:
    (a) the hub member has cylindrical centering surfaces for the pressings,
    (b) the two pressings are provided on their opposing inside surfaces with a layer of solderable material and are soldered both to the hub member and to one another at their contiguous surfaces,
    (c) the two contiguous pressings form a spoke wheel center having spokes constituted of closed hollow sections and
    (d) the spokes comprise substantially tangential main spokes and short radial auxiliary spokes, the main spokes extending inwardly from the rim bed in a direction approximately tangentially relative to the hub member and, at their innermost locations relative to the hub member, intersecting another main spoke, and the auxiliary spokes connecting radially the main spokes, at the innermost locations of the main spokes, to the hub member.

2. A wheel according to claim 1, wherein the spoke sections of the two pressings have an approximately oval cross-section with a larger dimension in the axial direction which is progressively reduced radially outwardly along the spokes.

3. A wheel according to claim 1, wherein the hub member is a casting and has holes for assembly screws in two spaced flanges for mounting the pressings and for connecting other wheel parts.

4. A wheel according to claim 1, wherein the hub member comprises an externally smooth tubular element on which are mounted two pressings each having outwardly directed flanges contiguous with the hub member, wherein in an annular space between the pressings adjacent the hub member, which annular space includes angularly spaced auxiliary spokes, the pressings are reinforced by steel reinforcing rings whose shape corresponds to the inside shape of the pressings in their spoke-free sections of the annular space and which have inwardly directed abutting flanges contiguous with the hub member, the pressings being affixed to the hub member and to one reinforcing ring and each reinforcing ring being affixed to the hub member, and wherein mounting holes are located in the area of the pressings reinforced by the reinforcing rings.

5. A wheel according to claim 4, wherein the hub member is formed of light metal.

6. A wheel according to claim 1, having a cavity between the pressings and depressions in the rim bed, wherein the cavity and depressions are filled with a cellular hard foam.

7. A wheel according to claim 6, wherein the cellular hard foam comprises hard polyurethane foam.

8. A method for the manufacture of the wheel of claim 1, wherein heat treatment of the pressings and their soldering to one another is performed simultaneously in a single annealing process.

9. A wheel according to claim 1, wherein each main spoke intersects at least two other main spokes.

* * * * *